Patented Sept. 13, 1938

2,130,239

UNITED STATES PATENT OFFICE 2,130,239

PHONOGRAPH RECORD

James H. Hunter, Lansdowne, Pa., assignor to Radio Corporation of America, a corporation of Delaware No Drawing. Application February 27, 1937, Serial No. 128,075

8 Claims. (Cl. 106—1.5)

This invention relates to phonograph records, and more particularly to a composition of matter especially fit for use in the manufacture of such records.

It has long been recognized in the resin record industry that one of the requirements of a good record material is that it shall have good flow characteristics. Another very essential requirement for commercial records is that they shall have as great a resistance to warping as possible. With the materials heretofore employed for the manufacture of phonograph records, it has been possible to attain the foregoing results with varying degrees, but in most instances it has been found that materials which have good molding properties invariably lack sufficient warp resistance, while those which are not easily subject to warping very frequently are difficult to mold.

The primary object of my present invention is to provide an improved composition of matter which is suitable for phonograph records and which will be free from the aforementioned defects present in prior art compositions.

More specifically, it is an object of my present invention to provide an improved molding compound which will readily lend itself to facile molding and which will not be subject to appreciable warping even under extreme conditions.

Another object of my present invention is to provide an improved composition of matter suitable for the manufacture of phonograph records which can be easily compounded and which will not be costly.

It is also an object of my present invention to provide an improved composition of matter suitable for the manufacture of phonograph records which will not only readily lend itself to processing, such as working, pressing and blanking, but which will result in records having excellent characteristics from the standpoint of long life and fidelity of reproduction.

In accordance with my present invention, I form the record material of a mixture of natural and synthetic resins, the synthetic resin being one known commercially as "Vinsol", and being an extract from long leaf yellow pine tree stumps.

In preparing this resin, the stumps are disintegrated or shredded, and the shredded material is extracted in large heated cylinders by means of a solvent such as benzol or some other suitable aromatic hydrocarbon. The solvent extracts the "Vinsol" resin along with rosin, turpentine, pine oil, and miscellaneous other materials from the shredded stumps, after which the liquid is subjected to a distillation process. In the distilling cycle, the solvent is the first material to be removed, followed by the turpentine and finally the pine oil, and a residue consisting of rosin and "Vinsol" remains in the still. The molten resin is then run into a hot mixture of gasolene and furfural, and the rosin dissolves in the gasolene while the "Vinsol" dissolves in the furfural. The mixture is then allowed to stand and settle until two liquid layers have formed, one consisting of gasolene and rosin, and the other consisting of "Vinsol" and furfural. The "Vinsol"-furfural layer is then run through a continuous still whereby the furfural is removed, and the "Vinsol" resin comes out in a hot molten state, being run into sheet metal containers and distributed therein in the market.

The exact chemical composition of the "Vinsol" resin is not definitely known. It has been ascertained, however, that the "Vinsol" resin consists essentially of a highly oxidized form of abietic acid, and much smaller proportions of resin acids, polyphenols, ligneous materials, and unoxidized abietic acid. The oxidation of the abietic acid raises the melting point and results in a resin having a high melting point and free from the tackiness usually associated with ordinary rosins.

I have found that the "Vinsol" resin can very advantageously be incorporated along with other resins, either natural or synthetic, to provide a record composition which lends itself readily to molding and which is markedly free from warping when in sheet or tablet form. I attribute the improved warp characteristics of such material to the relatively high melting point of the "Vinsol" resin, while its ability to enhance molding is apparently due to the fact that, when once softened by heat, it liquefies more quickly and therefore helps the flow of the material.

A typical formula, according to my present invention is one in which the "Vinsol" resin is substituted for a considerable portion of the other resin (for example, shellac) ordinarily used in record compounds, and has the following constituents:

| | Pounds |
|---|---|
| Shellac | 24 |
| Vinsol | 6 |
| Filler | 60 |
| Pigment | 10 |

It is to be understood that the foregoing formula is by no means limiting, as the "Vinsol" content can be varied over a substantial range.

In fact, I have found that a "Vinsol" content of twice that specified above satisfactorily produces the advantages heretofore noted. Also, it will be evident that in place of shellac, other resins may be used, such as vinyl resins, phenolic resins, resins derived from acrylic acid and its derivatives, urea resins, etc., as may other compositions which become plastic under the action of heat, either with or without pressure, such as cellulose acetate and cellulose nitrate. The particular fillers employed will depend upon the specific requirements to be met and may consist of slate, various clays, metal oxides and silicates, diatomaceous or infusorial earth, or certain very fine, chemically formed metal oxides (for example, $Cr_2O_3$), as disclosed and claimed in my copending application Serial No. 128,074, filed February 27, 1937. If desired, suitable plasticizers, mold lubricants, and the like may also be incorporated, and many other changes, which will undoubtedly readily suggest themselves to those skilled in the art, may also be made in the above formula, which has been cited merely by way of example. I desire, therefore, that my invention shall not be limited except insofar as is made necessary by the prior art and by the spirit of the appended claims.

I claim as my invention:

1. A phonograph record comprising a moldable material having as constituents thereof a natural resin and a synthetic resin, said synthetic resin comprising an extract derived from long leaf yellow pine trees.

2. A phonograph record comprising a moldable material having as constituents thereof shellac and oxidized abietic acid.

3. A phonograph record comprising a moldable plastic material and including as ingredients thereof shellac and oxidized abietic acid extracted from long leaf yellow pine trees.

4. A phonograph record as claimed in claim 3 characterized in that the ratio of shellac to oxidized abietic acid is in the neighborhood of 4 to 1.

5. A phonograph record as claimed in claim 3 characterized in that the ratio of shellac to oxidized abietic acid is in the neighborhood of 2 to 1.

6. A phonograph record as claimed in claim 3 characterized in that the ratio of shellac to oxidized abietic acid is in the neighborhood of not less than 2 to 1 nor more than 4 to 1.

7. A phonograph record as claimed in claim 3 characterized in that said record includes also a substantial quantity of filler.

8. A phonograph record as claimed in claim 3 characterized in that said record includes also a substantial quantity of filler, the filler content being in excess of the combined content of shellac and oxidized abietic acid.

JAMES H. HUNTER.